(12) United States Patent
Suzuki et al.

(10) Patent No.: US 8,240,457 B2
(45) Date of Patent: Aug. 14, 2012

(54) BREAD CONVEYING APPARATUS

(75) Inventors: Nobuhiro Suzuki, Fujisawa (JP); Shuichi Iribe, Fujisawa (JP); Michinori Watanabe, Fujisawa (JP); Seiichi Akutsu, Fujisawa (JP)

(73) Assignee: Oshikiri Machinery Ltd., Kanagawa-ken (JP)

( * ) Notice: Subject to any disclaimer, the term of this patent is extended or adjusted under 35 U.S.C. 154(b) by 0 days.

(21) Appl. No.: 12/929,167

(22) Filed: Jan. 5, 2011

(65) Prior Publication Data
US 2012/0067700 A1 Mar. 22, 2012

(30) Foreign Application Priority Data
Sep. 21, 2010 (JP) ................................ 2010-211467

(51) Int. Cl.
*B65G 47/31* (2006.01)
(52) U.S. Cl. .................................. 198/461.1; 198/461.2
(58) Field of Classification Search ............... 198/460.1, 198/461.1, 461.2, 461.3
See application file for complete search history.

(56) References Cited

U.S. PATENT DOCUMENTS

| | | | |
|---|---|---|---|
| 3,417,546 A | 12/1968 | Irwin | |
| 3,421,286 A | 1/1969 | Chambless, Jr. | |
| 3,421,287 A | 1/1969 | Sheets | |
| 3,451,192 A | 6/1969 | Irwin | |
| 3,538,671 A | 11/1970 | Wallace | |
| 3,556,316 A | 1/1971 | Marasso et al. | |
| 3,579,957 A | 5/1971 | Mills, Jr. et al. | |
| 3,938,650 A * | 2/1976 | Holt | 198/461.2 |
| 4,463,627 A | 8/1984 | Zelle | |
| 4,671,048 A | 6/1987 | Rademacher | |
| 4,694,715 A | 9/1987 | Jongerius | |
| 4,815,581 A * | 3/1989 | Deutschlander | 198/461.3 |
| 4,925,006 A * | 5/1990 | Lentz et al. | 198/461.1 |
| 5,097,939 A * | 3/1992 | Shanklin et al. | 198/460.1 |
| 5,477,662 A | 12/1995 | Rompa | |
| 5,743,071 A | 4/1998 | Wolthuizen | |
| 6,421,984 B1 | 7/2002 | Murgatroyd et al. | |
| 6,766,898 B2 | 7/2004 | Lessard et al. | |

FOREIGN PATENT DOCUMENTS

| | | |
|---|---|---|
| JP | 44-1594 | 1/1969 |
| JP | 63-21 A | 1/1988 |

* cited by examiner

*Primary Examiner* — James R Bidwell
(74) *Attorney, Agent, or Firm* — McGinn IP Law Group, PLLC

(57) ABSTRACT

A bread conveying apparatus comprises: a first discharge conveyer for conveying bread, the first discharge conveyer disposed along a conveying path on which the bread is conveyed; and a second discharge conveyer for conveying the bread, the first discharge conveyer disposed along the conveying path and having a common region that partially overlaps with a region on the conveying path where the first discharge conveyer runs, wherein the first discharge conveyer has a first flight for urging the bread, and the second discharge conveyer has a second flight for urging the bread, and wherein a conveying speed at which the bread is conveyed by the second discharge conveyer is different from a conveying speed at which the bread is conveyed by the first discharge conveyer.

20 Claims, 5 Drawing Sheets

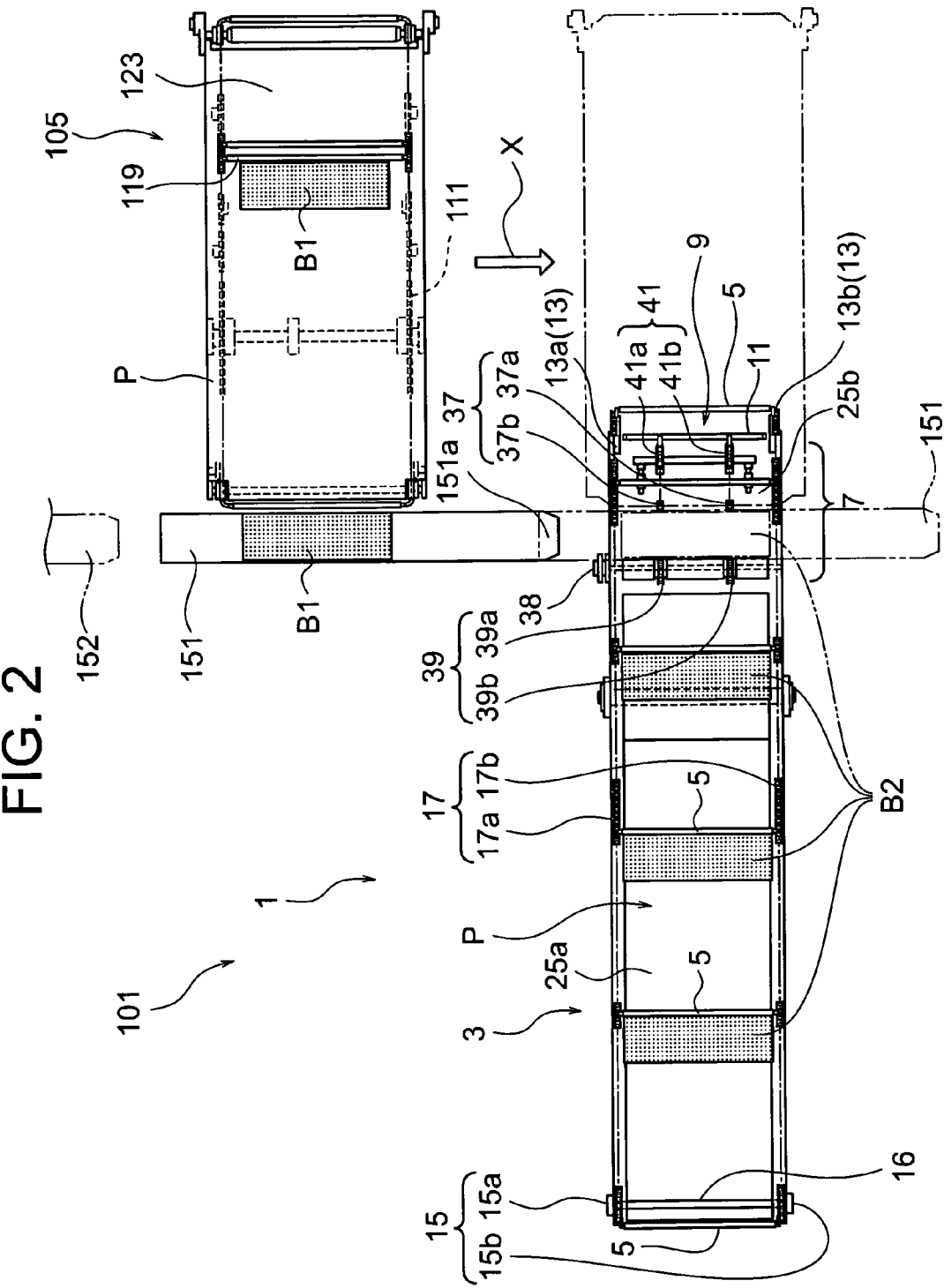

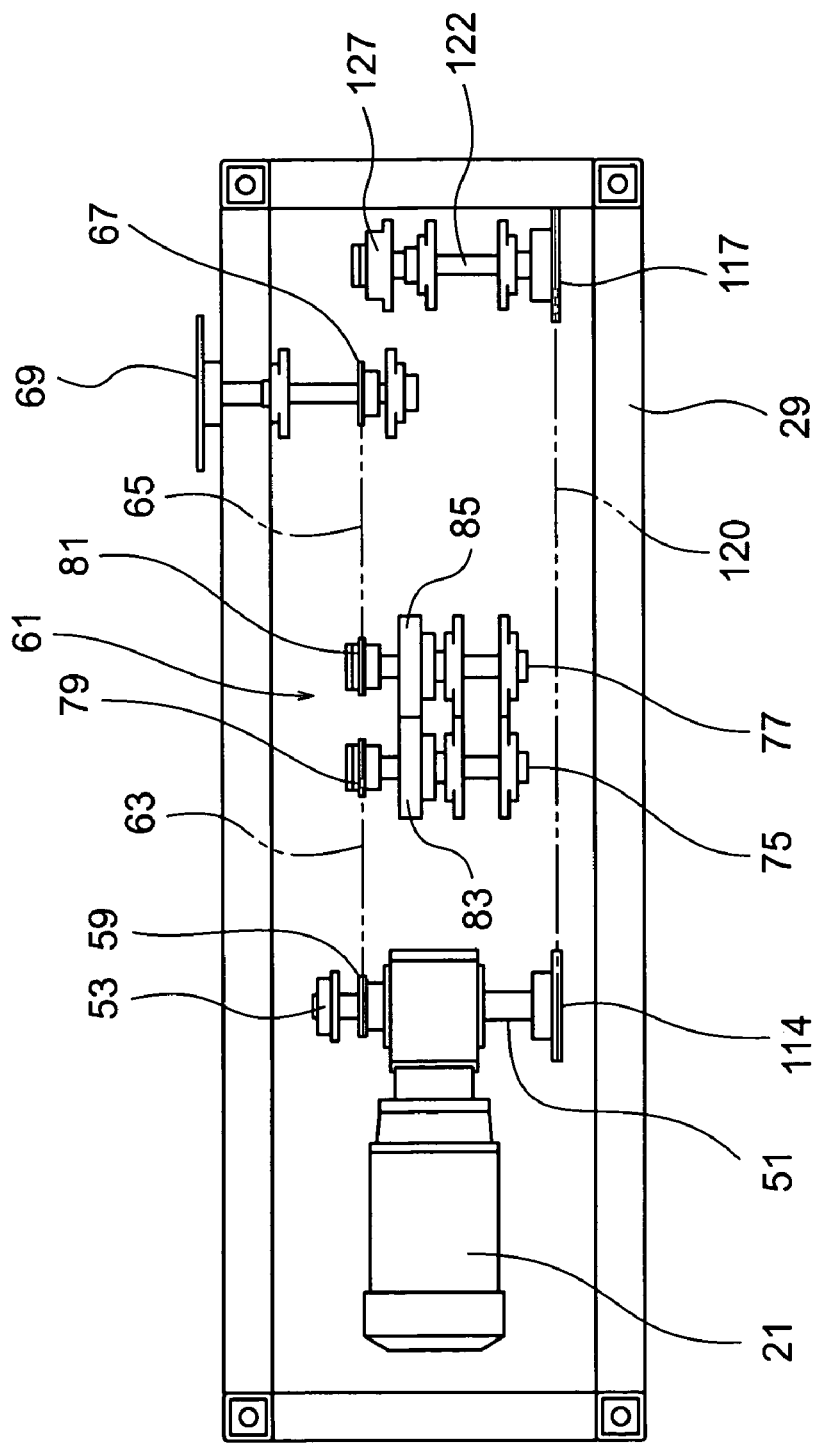

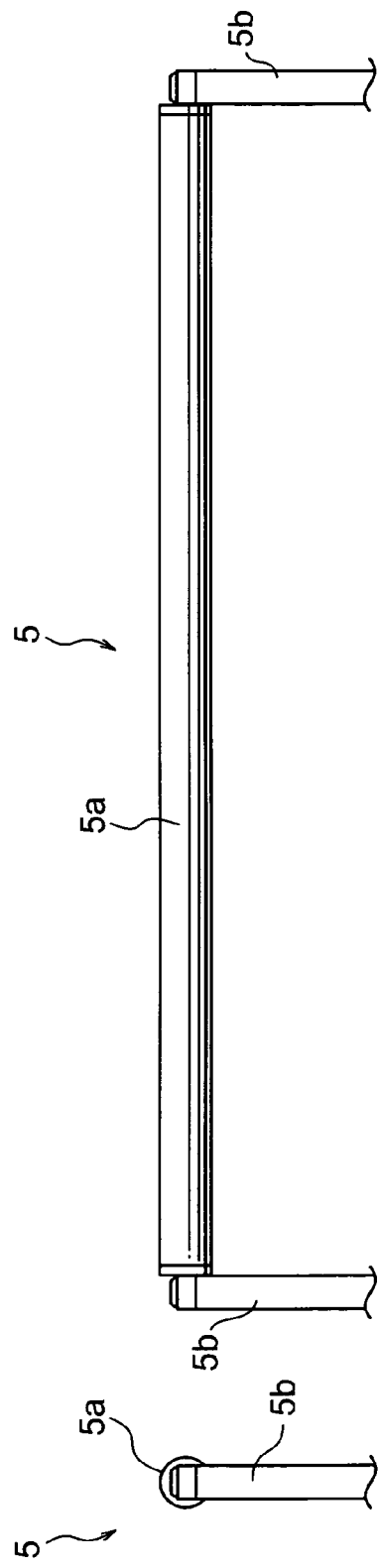

BREAD CONVEYING APPARATUS

BACKGROUND OF THE INVENTION

1. Field of the Invention

The present invention relates to a bread conveying apparatus for conveying the bread, in particular, a bread conveying apparatus adapted to change the conveying speed in a conveying path on which the bread is conveyed.

2. Description of the Related Art

Bread packaging apparatuses for packaging a long loaf bread (for example, three-loaf length) into a packaging material such as a polyethylene bag have been conventionally used. For example, JP Patent Application Publication No. S44-001594 discloses a conventional bread packaging apparatus. This conventional bread packaging system is adapted to introduce a loaf bread to a scoop by an in-feed conveyer, contain the loaf bread in a polyethylene bag by a reciprocating motion of the scoop, and cause the loaf bread contained in the bag to fall from the scoop onto the discharge conveyer. Then, the apparatus conveys the packaged loaf bread to the next process (for example, a process of sealing the bag) by a flight of the discharge conveyer.

In addition, the scoop for packaging the loaf bread moves forward across a conveying path on which the loaf bread is conveyed and holds the packaging material. Further, when the scoop holding the packaging material moves back across the conveying path, the loaf bread is contained in the packaging material and the packaged loaf bread falls onto the conveying path. As such, in the conventional packaging system, the loaf bread is packaged by the reciprocating motion of the scoop.

Another conventional bread packaging system is disclosed in U.S. Pat. No. 6,766,898. The bread packaging system disclosed by U.S. Pat. No. 6,766,898 comprises a first conveyer having an endless belt on which a flight for urging the loaf bread is mounted and the loaf bread is placed; and a second conveyer having an endless chain on which an impact striker for urging the flight is mounted. In this configuration, by revolving the endless chain faster than the endless belt, the flight is moved relatively faster when the impact striker is urging the flight than when the impact striker is not contacting to the flight.

In the conventional bread packaging system for packaging the bread such as loaf bread as disclosed in JP Patent Application Publication No. S44-001594, if there is packaged loaf bread in the reciprocating motion region on the conveying path where the scoop passes, the subsequent loaf bread is not allowed to be packaged. Thus, in order to achieve the high speed packaging process for packaging the loaf bread, it may be possible to convey the loaf bread fallen onto the conveying path at a high speed.

However, the conveying speed at which the packaged loaf bread is conveyed by a discharge conveyer, i.e., the bread conveying apparatus, is set based on the timing for carrying it out to the next process. Therefore, without taking into consideration of the timing for carrying it out to the next process and only with taking into consideration of the process of packaging the bread, it is difficult to increase the moving speed of the scoop and thus the operation speed of the bread conveying apparatus. As a result, there has been difficulty in increasing the processing speed of the bread packaging system in which the bread conveying apparatus is incorporated.

In the bread packaging system disclosed in U.S. Pat. No. 6,766,898, the first endless belt on which the flight is mounted is expandable.

Therefore, there is likely to be a problem that, when the engagement of the impact striker with the flight is released, the contracted endless belt expands and the placed bread or the flight returns to the upstream, which may interfere the operation of the preceding process (for example, the operation of the scoop). Moreover, there are likely to be problems of the impact sound that occurs at the collision between the impact striker and the flight, and the friction powders caused by the friction between the impact strider and the flight.

SUMMARY OF THE INVENTION

The present invention is provided to address the above situation. That is, the objective of the present invention is to provide a bread conveying apparatus with a simple configuration that has regions where the conveying speeds are different in the conveying path on which the bread is conveyed, so as not to interfere the operation of the preceding process and adapted not to generate the impact sound and the friction powders.

To resolve the above problems and to attain the object, a bread conveying apparatus of the invention comprises: a first discharge conveyer for conveying bread, the first discharge conveyer disposed along a conveying path on which the bread is conveyed; and a second discharge conveyer for conveying the bread, the first discharge conveyer disposed along the conveying path and having a common region that partially overlaps with a region on the conveying path where the first discharge conveyer runs, wherein the first discharge conveyer has a first flight for urging the bread, and the second discharge conveyer has a second flight for urging the bread, and wherein a conveying speed at which the bread is conveyed by the second discharge conveyer is different from a conveying speed at which the bread is conveyed by the first discharge conveyer.

A bread conveying apparatus according to the present invention comprises a first discharge conveyer and a second discharge conveyer whose conveying paths partially overlap to each other, where conveying speeds of a first flight of the first discharge conveyer and a second flight of the second discharge conveyer are different. Therefore, with a simple configuration, the bread conveying speeds can be adjusted along the conveying path so as not to interfere the operation of the preceding process.

Further, the bread is conveyed by the first flight and the second flight whose speeds are different along the conveying path. Therefore, it is not necessary for the parts to be collided with each other because of the different speeds, so that no impact sound nor friction powder is likely to be generated.

Further features of the present invention will become apparent from the following description of exemplary embodiments with reference to the attached drawings.

BRIEF DESCRIPTION OF THE DRAWINGS

FIG. 2 is a plane view schematically showing in a divided manner the main components of the loaf bread packaging system according to the embodiment.

FIG. 3 is a cross section view taken along a line of FIG. 1.

FIG. 4A is a front view of a first flight of the loaf bread conveying apparatus, and FIG. 4B is a side view of a first flight of the loaf bread conveying apparatus.

DESCRIPTION OF THE EMBODIMENTS

Figure 1:
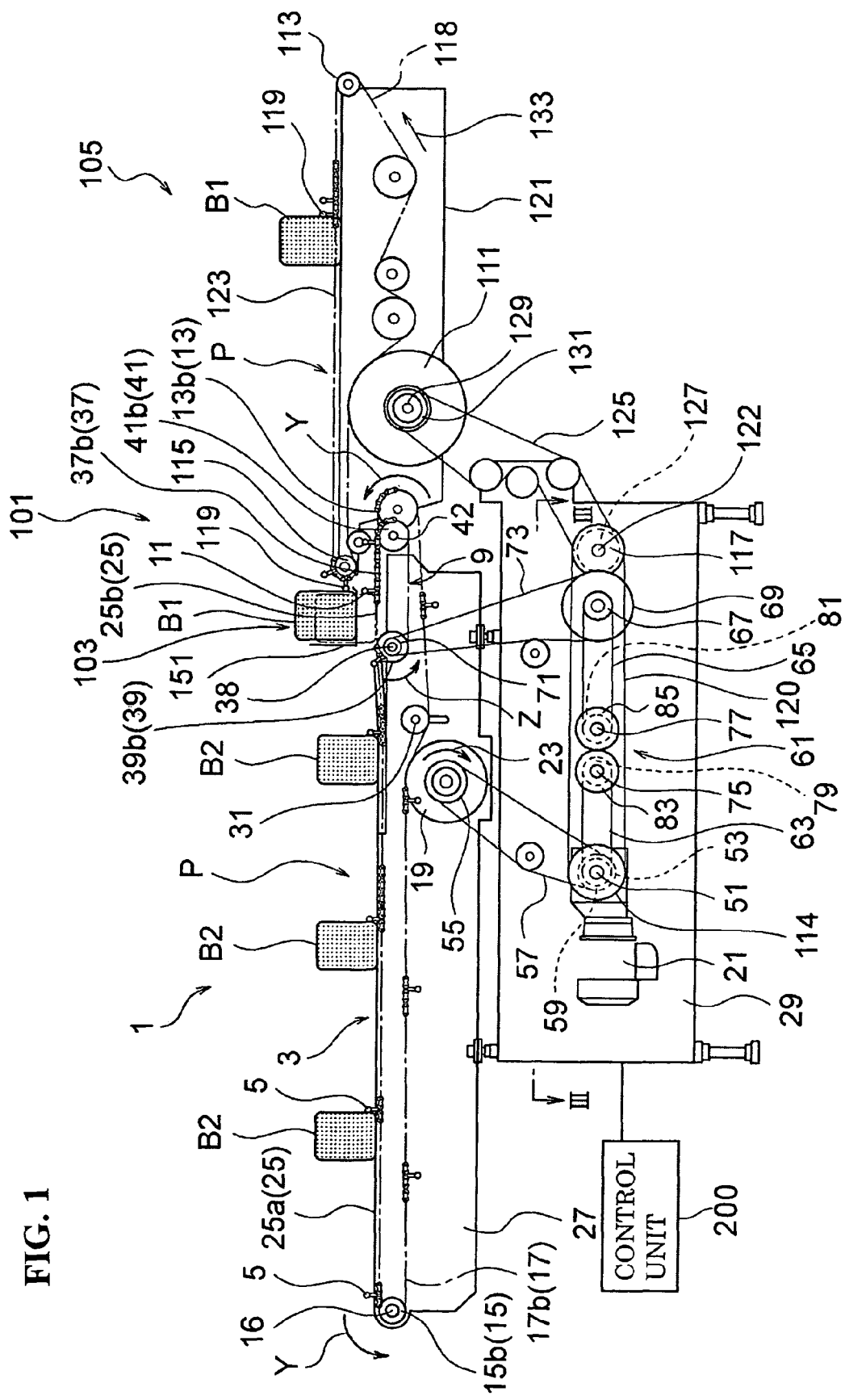
FIG. 1 is a side view schematically showing main components of a loaf bread packaging system according to an embodiment.

Preferred embodiments of the present invention will now be described in detail in accordance with the accompanying drawings.

By referring to the drawings, below will be described a loaf bread packaging system 101 according to an embodiment to which a bread conveying apparatus of the present invention is applied. It is noted that the preset invention is not limited to this embodiment.

Figure 5A:
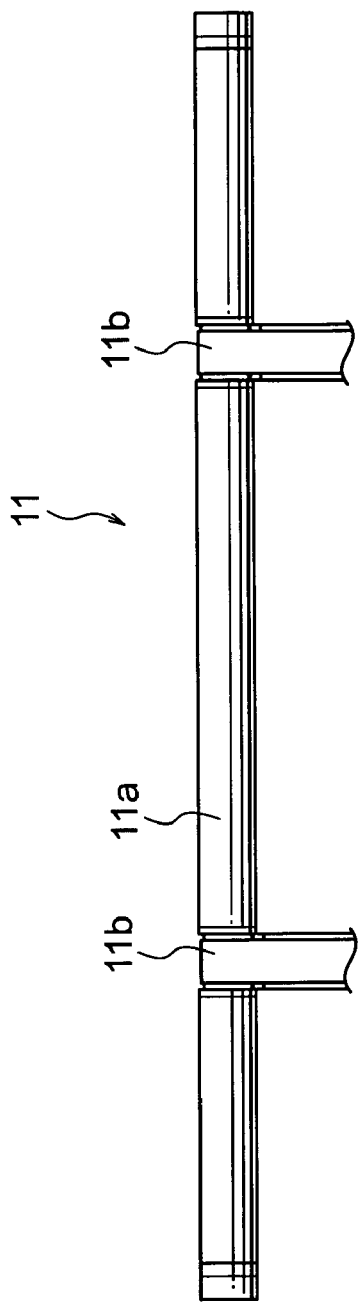
FIG. 5A is a front view of a second flight of the loaf bread conveying apparatus.
Figure 5B:
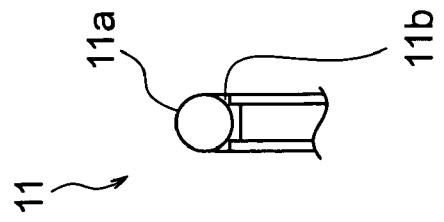
FIG. 5B is a side view of a second flight of the loaf bread conveying apparatus.

FIG. 1 is a side view schematically showing main components of the loaf bread packaging system 101 according to the embodiment, FIG. 2 is a plane view schematically showing in a divided manner the main components of the loaf bread packaging system 101 according to the embodiment, FIG. 3 is a cross section view taken along a line III-III of FIG. 1, FIG. 4A is a front view of a first flight of the loaf bread conveying apparatus, FIG. 4B is a side view of a first flight of the loaf bread conveying apparatus, FIG. 5A is a front view of a second flight of the loaf bread conveying apparatus, and FIG. 5B is a side view of a second flight of the loaf bread conveying apparatus.

It is noted that, for clarity of each component, FIG. 2 illustrates a state where a loaf bread packaging apparatus 103 and an in-feed conveyer 105 are separated from a loaf bread conveying apparatus 1. Therefore, in the actual implementation, the loaf bread packaging apparatus 103 and the in-feed conveyer 105 depicted by the solid line in FIG. 2 are disposed in the position depicted by the long dashed double-short dashed line in the direction of the arrow X. Throughout the present specification, "downstream" refers to the direction in which the loaf bread is conveyed, and "upstream" refers to the opposite direction. Further, "right side" (or "left side") refers to the right (the left) with respect to the direction in which the bread is conveyed.

As shown in FIGS. 1 and 2, the loaf bread packaging system 101 mainly comprises the loaf bread packaging apparatus for packaging the loaf bread B1; the in-feed conveyer 105 for conveying the loaf bread B1 produced by the preceding process to the loaf bread packaging apparatus 103; and the loaf bread conveying apparatus 1 for conveying the packaged loaf bread B2 to the next process. That is, along a conveying path P for the unpackaged loaf bread B1 and the packaged loaf bread B2, the in-feed conveyer 105 is disposed upstream the loaf bread packaging apparatus 103 and the loaf bread conveying apparatus 1 is disposed downstream the loaf bread packaging apparatus 103.

The loaf bread conveying apparatus 1 mainly comprises a first discharge conveyer 3 that is disposed along the conveying path P and conveys the loaf bread B2; a first flight 5 that is mounted on the first discharge conveyer 3 and urges the loaf bread B2; a second discharge conveyer 9 that is disposed along the conveying path P and runs in a common region 7 that partially overlaps with the region on the conveying path P where the first discharge conveyer 3 runs; and a second flight 11 that is mounted on the second discharge conveyer 9 and urges the loaf bread B2.

Further, the conveying speed at which the loaf bread B2 is conveyed by the second discharge conveyer 9 is different from the conveying speed at which the loaf bread B2 is conveyed by the first discharge conveyer 3. In the present embodiment, the conveying speed of the second discharge conveyer 9 is higher than the conveying speed of the first discharge conveyer 3.

The detailed explanations for respective components of the loaf bread conveying apparatus 1 will be provided below. The first discharge conveyer 3 comprises an upstream end sprocket 13 disposed upstream the conveying path P; a downstream end sprocket 15 disposed downstream the conveying path P; and an endless chain 17 wound around the upstream end sprocket 13 and the downstream end sprocket 15. The upstream end sprocket 13 and the downstream end sprocket 15 are rotatably fixed to a conveyer base 27 extending in the direction that the conveying path P extends.

Further, the conveying path P in the loaf bread conveying apparatus 1 is defined by a carrier plate 25 that is the plate-like member adapted to slide the loaf bread B2. The carrier plate 25 includes a second carrier plate 25b located in the common region of the conveying path P; and a first carrier plate 25a located downstream the conveying path P with respect to the second carrier plate 25b. The first carrier plate 25a and the second carrier plate 25b are spaced apart from each other by a predetermined distance in the extending direction of the conveying path P, and a contact portion 11a of the second flight 11 (see FIG. 5) passing over the second carrier plate 25b is adapted to go around a second driving shaft 38. The first carrier plate 25a and the second carrier plate 25b are fixed horizontally to the conveyer base 27. Further, the conveyer base 27 is fixed to the apparatus main body 29 that is a box-like housing of the loaf bread conveying apparatus.

A first discharge conveyer 3 has a driving sprocket 19 that applies the rotation force to the first endless chain 17. The driving sprocket 19 is rotatably supported by the conveyer base 27, and disposed between the upstream end sprocket 13 and the downstream end sprocket 15 and at the outer circumference of the first endless chain 17. When the rotation force from the drive motor 21 described later is transmitted to the driving sprocket 19 (the direction of the arrow 23), the first endless chain 17 is revolved in the direction of the arrow Y.

The first endless chain 17 includes a first right endless chain member 17a and a first left endless chain member 17b disposed in parallel along both edges opposing in the width direction (the upper-lower direction in FIG. 2) of the first carrier plate 25a. Further, the first right endless chain member 17a is wound around the right upstream end sprocket 13a and the right downstream end sprocket 15a, and the first left endless chain member 17b is wound around the left upstream end sprocket 13b and the left downstream end sprocket 15b. Further, between the first right endless chain member 17a and left endless chain member 17b, a plurality of the first flights 5 extending in the perpendicular direction with respect to the conveying path P are fixed around both endless chain members 17a, 17b by equal interval. As shown in FIG. 4, the first flight 5 comprises a first contact member 5a that comes into contact with the loaf bread B2; and two first flight support members 5b rotatably supporting the contact member 5a.

The first contact member 5a is a cylindrical member made of metal with a predetermined radius of curvature. The two first flight support members 5b respectively extend perpendicularly with respect to the carrier plate 25, and their lengths in the longitudinal direction are sized so that the first contact member 5a can come into contact with the loaf bread B2 placed on the carrier plate 25. Two first flight support members 5b are fixed to the first right endless chain member 17a and the first left endless chain member 17b, respectively.

In addition, in the present embodiment, a tension adjustment sprocket 31 for adjusting the tension of the first endless chain 17 is disposed between the upstream end sprocket 13 and the downstream end sprocket 15.

The second discharge conveyer 9 includes a second driving sprocket 39; a second driven sprocket 41; and a second endless chain 37 wound around the second driving sprocket 39 and a second driven sprocket 41. The second endless chain 37 includes a second right endless chain member 37a and a second left endless chain member 37b arranged in parallel in the longitudinal direction (the upper-lower direction in FIG. 2) of the second carrier plate 25b. The second driving sprocket 39 includes a second right driving sprocket 39a and a second left driving sprocket 39b, and the second driven sprocket 41 includes a second right driven sprocket 41a and a left driven sprocket 41b.

The second right endless chain member 37a is wound around the second right driving sprocket 39a and the right driven sprocket 41b, and the second left endless chain member 37b is wound around the second left driving sprocket 39b and the left driven sprocket 41b. In addition, the second right driving sprocket 39a and the second left driving sprocket 39b are arranged spaced apart from each other on the second driving shaft 38 that is rotatably supported. Also, the second right driven sprocket 41a and the left driven sprocket 41b are spaced apart from each other on a second driven shaft 42 rotatably supported.

Further, between the right endless chain member 37a and the left endless chain member 37b, the single second flight 11 extending in the perpendicular direction with respect to the second carrier plate 25b is fixed to both second endless chain members 37a, 37b. As shown in FIG. 5, the second flight 11 includes a second contact member 11a that extends in the direction crossing the conveying path P and comes into contact with the loaf bread B2; and two second flight support members 11b that support the portions located at a predetermined distance from the ends of the second contact member 11a with respect to the longitudinal direction thereof.

The second contact member 11a is a cylindrical member made of metal with a predetermined radius of curvature. The lengths of the two second flight support members 11b are sized so that the second contact member 11a extending from the second endless chain 37 can come into contact with the loaf bread B2 placed on the second carrier plate 25b. One end portion of the second flight support member 11b has a curved shape to rotatably support the second contact member 11a in the groove provided on the outer circumference of the second contact member 11a, and the other end extends linearly and is fixed to the right (left) endless chain member 37a (37b). In addition, the second contact member 11a and the second flight support members 11b are sized such that the outer circumference surface of one end portion of the second flight support member 11b and the outer circumference surface of the second contact member 11a are on the same plane.

Further, the first endless chain 17 and the second endless chain 37 extend along the common region 7, and the common region 7 is the overlapping segment on the conveying path P on which the loaf bread B2 is conveyed (that is, the second driving sprocket 39 is disposed downstream the upstream end sprocket 13 with respect to the conveying path P, and the second driven sprocket 41 is disposed upstream the downstream end sprocket 15 with respect to the conveying path P). Therefore, the relative positions of the first endless chain 17 and the second endless chain 37 with respect to the width direction of the conveying path P are offset so that the operations of the first and second endless chains 17, 37 do not interfere to each other.

When the driving sprocket 39 of the second discharge conveyer 3 in the above arrangement is rotated, the second endless chain 37 and the second flight 11 revolve and thus the second driven sprocket 41 rotates.

Next, the driving system of the loaf bread conveying apparatus 1 will be explained. As shown in FIG. 3, a drive source of the drive motor 21 is disposed within the apparatus main body 29. The rotation shaft (not shown) of the drive motor 21 is connected to a driveshaft 51 via a worm gear and the like (not shown). A first conveying sprocket 53 is mounted on one end portion of the driveshaft 51. As shown in FIG. 1, a first conveying drive chain 57 is wound around the first conveying sprocket 53 and the first driven sprocket 55 fixed coaxially to the rotation shaft of the driving sprocket 19. Therefore, the rotation force from the driving motor 21 is transmitted to the first driving sprocket 19 via the first conveying sprocket 53, the first conveying drive chain 57, and the first driven sprocket 55.

Further, a second conveying sprocket 59 is mounted on the driveshaft 51 of FIG. 3 at the position spaced apart from the first conveying sprocket 53 with respect to the axial direction of the driveshaft 51. The second conveying sprocket 59 is connected via a first transmission chain 63 to a transmission mechanism 61 disposed near the center of the apparatus main body 29. Further, the transmission mechanism 61 is connected to the transmission sprocket 67 by the second transmission chain 65. On the rotation shaft on which the transmission sprocket 67 is mounted, a coaxial sprocket 69 is mounted coaxially with the transmission sprocket 67. As shown in FIG. 1, a third transmission chain 73 is wound around the coaxial sprocket 69 and a driving transmission sprocket 71 fixed to the second driveshaft 38. Therefore, the rotation force of the drive motor 21 is transmitted to the second driving sprocket 39 via respective elements and the driving transmission sprocket 71.

As shown in FIG. 3, the transmission mechanism 61 includes a first transmission shaft 75; a second transmission shaft 77; an input sprocket 79 and an output sprocket 81 mounted on the first and the second transmission shafts 75, 77, respectively; and an input gear 83 and an output gear 85 transmitting the rotation force between the input and the output sprockets 79 and 81. The axis of the first transmission shaft 75 and the axis of the second transmission shaft 77 are in parallel, and the first and second transmission shafts 75, 77 are rotatably supported by the apparatus main body 29. The first transmission chain 63 is wound around the input sprocket 79, and the rotation force from the drive motor 79 is transmitted to the input sprocket 79. When the first transmission shaft 75 is rotated by the rotation force supplied from the input sprocket 79, the input gear 83 mounted on the first transmission shaft 75 is rotated.

The rotation force of the input gear 83 is transmitted to the output gear 85 meshing with the input gear 83. The output gear 85 is mounted to the second transmission shaft 77. Therefore, the rotation force from the output gear 85 is transmitted to the output sprocket 81. The second transmission chain 65 is wound around the output sprocket 81 and the transmission sprocket 67. Therefore, the rotation force from the output sprocket 81 is transmitted to the transmission sprocket 67 via the second transmission chain 65.

As described above, in the loaf bread conveying apparatus 1 of the present embodiment, the first discharge conveyer 3 and the second discharge conveyer 9 are operated by the rotation force from a single drive motor. Further, the conveying speeds of the first discharge conveyer 3 and the second discharge conveyer 9 can be adjusted by changing the number and the size of the element of the above described drive system.

[In-feed Conveyer]

Next, the in-feed conveyer 105 will be briefly explained. The in-feed conveyer 105 mainly comprises an in-feed sprocket 111; an in-feed upstream end sprocket 113; an in-feed downstream end sprocket 115; an in-feed endless chain 118 wound around the in-feed upstream end sprocket 113 and the in-feed downstream sprocket 115.

The region of the in-feed endless chain 118 from the in-feed upstream end sprocket 113 to the in-feed downstream sprocket 115 extends along the conveying path P. A plurality of in-feed flights 119 are provided to the in-feed endless chain 118 by equal interval in its circumference direction. An in-feed plate 123 defining the conveying path P horizontally extends and is fixed to an in-feed main body 121 that is the housing of the in-feed conveyer 105. The unpackaged loaf bread B1 is urged by the in-feed flight 119 and slides on the in-feed plate 123. It is noted that the in-feed plate 123 extends higher than the above-described carrier plate 25 with respect to the upper-lower direction of FIG. 1, and the in-feed plate 123 and the carrier plate 25 are different in height from the floor level on which the packaging system 101 is placed.

The rotation force is supplied to the in-feed conveyer 105 by the above-described drive motor 21. As shown in FIG. 3, an in-feed sprocket 114 is mounted on the driveshaft 51 rotated by the drive motor 21. An in-feed transmission chain 120 is wound around the in-feed sprocket 114 and the in-feed transmission sprocket 117. An in-feed transmission sprocket 127 is mounted on the rotation shaft 122 of the in-feed transmission sprocket 117 coaxially with the in-feed transmission sprocket 117. A transmission endless chain 125 is wound around the in-feed transmission sprocket 117-and an in-feed transmission sprocket 131 that is mounted on an in-feed driveshaft 129 coaxially with the in-feed driving sprocket 111 (see FIG. 1).

As such, the rotation force from the drive motor 21 is transmitted to the in-feed driving sprocket 111 via the above-described elements. When the in-feed driving sprocket 111 is rotated, the in-feed endless chain 118 is revolved in the direction of the arrow 133. Therefore, the loaf bread B1 supplied from the preceding process is conveyed by the in-feed flight 119 on the in-feed plate 123 along the conveying path P from the in-feed upstream end sprocket 113 to the in-feed downstream end sprocket 115.

[Loaf Bread Packing Apparatus]

The configuration of the loaf bread packaging apparatus 103 will be briefly explained. The loaf bread B1 is introduced into the loaf bread packaging apparatus 103 by the in-feed conveyer 105. The loaf bread packaging apparatus 103 comprises a scoop for holding the packaging material such as a polyethylene bag in which the loaf bread B1 is to be contained; and a reciprocating motion mechanism for reciprocating the scoop in the direction across the conveying path P. Since the reciprocating motion mechanism and the scoop are known, the details of the configurations thereof are omitted.

In FIGS. 1 and 2, a lower scoop 151 of the scoops only is shown. FIG. 2 shows a state where the lower scoop 151 is in a forward position where it has reached the position for holding the packaging material by an end portion 151a of the lower scoop 151 and an end portion of the upper scoop (not shown). In this state, the loaf bread B1 conveyed by the in-feed conveyer 105 is introduced onto the lower scoop 151. It is noted that the region on which the loaf bread B1 of the lower scoop 151 is placed extends horizontally.

It is noted that, in the side view of FIG. 1, the flat surface of the lower scoop 151 is positioned above the carrier plate 25 and below the in-feed plate 123 with respect to the upper-lower direction in FIG. 1. Further, it is configured that the lower scoop 151 is in the position so as not to interfere the movement of the first and second flights 5, 11.

Once the scoop including the lower scoop 151 on which the loaf bread B1 is placed has moved back to the direction of a backward position (a state shown by the dashed line (reference number 152)), the loaf bread B1 is maintained on the conveying path P by a holding member (not shown) and held by the end portion 151a of the lower scoop 151, and then the loaf bread B1 is contained in the opened packaging member. Further, once the scoop has completely reached the backward position, the packaged loaf bread B2 falls from the lower scoop 151 onto the carrier plate 25 of the first discharge conveyer 3.

[Operation of Load Bread Conveying Apparatus]

In the loaf bread conveying apparatus 1, the second endless chain 37 revolves at the rotation speed faster than the first endless chain 17 does. Further, the drive motor 21 is controlled by a controller 200 so that the first endless chain 17 and the second endless chain 37 are revolved in uniform speeds, respectively. As described above, when the packaged loaf bread B2 falls onto the carrier plate 25 from the lower scoop 151, the second flight 11 first comes into contact with the loaf bread B2. In the common region 7 in the conveying path P, the second flight 11 conveys the loaf bread B2. The loaf bread B2 is moved at the conveying speed of the second endless chain 37 to the most downstream position of the common region 7, that is, the point where7 the second flight 11 starts going around the second driving sprocket 39 and the contact portion 11a of the second flight leaves the loaf bread B2.

As such, the first and second flights 5, 11 go around in the timing such that the first flight 5 comes into contact with the loaf bread B1, after the second flight 11 enters the common region 7 and conveys the loaf bread B2 before the first flight 5 reaches the common region 7. Therefore, the second flight 11 is revolved at the speed such that it enters the common region 7 before each of the first flights 5 enters the common region 7.

Afterward, the first flight 5 mounted on the revolving first endless chain 17 comes into contact with the resting loaf bread B2. The loaf bread B2 is conveyed on the carrier plate 25 by the first flight 5 in the direction (downstream the conveying path P) toward the downstream end sprocket 15. That is, in the region on the conveying path P except the common region 7, the loaf bread B2 is urged by the first flight 5 to be conveyed.

It is noted that, through the extensive research, the inventors have come to recognize that it is preferable to set the revolving speed of the second flight 11, i.e., the second endless chain 37 such that, within 10%-15% of the required time for the reciprocating motion, the packaged loaf bread B2 fallen onto the conveying path P moves outside the space where the scoop reciprocates (the reciprocating motion refers to the movement that the lower scoop 155 moves from the backward position 152 to the forward position and then returns from the forward position to the backward position).

As such, the process proceeds to the packaging process for the subsequent loaf bread B1 by moving the loaf bread B2 fallen onto the carrier plate 25 to the point where it does not obstruct the reciprocating motion of the scoop. Further, after the engagement with the loaf bread B2 by the second flight 11 is released, the first flight 5 engages with and conveys that loaf bread B2. The revolving speed of the first flight 5 is set to the speed at which the loaf bread B2 is supplied to the subsequent process in a timely manner. As such, by changing each conveying speed of each of the plurality of belt conveyers that are in a uniform motion, the conveying speed for conveying the loaf bread B2 can be properly changed for each region in the conveying path P.

Further, assuming that the loaf bread B2 is conveyed by a predetermined distance for the same period of time, the configuration that moves the loaf bread B2 at the constant speed (uniform velocity) allows the maximum speed of the first and second flights 5, 11 to be reduced, compared to the configuration that would move the loaf bread B2 by accelerating and decelerating the first endless chain 17 and the second endless chain 37. As a result, the impact given to the loaf bread B2 can be reduced to the minimum.

Further, the first contact portion 5a and the second contact portion 11a are rotatable and have circle cross sections perpendicular to their longitudinal direction. Therefore, when the first and second flights 5, 11 move away from the loaf bread B2, that is, as the first and second contact portions 5a, 11a revolve around the rotation shaft 16 of the downstream end sprocket 15 or the driveshaft 42, the contact portions 5a, 11a engage with the loaf bread B2 while the contact portions 5a, 11a rotate. As a result, it can prevent the loaf bread B2 from being deformed, damaged, or partially scraped off. Further, it can prevent the packaging material of the loaf bread B2 from being damaged or torn.

Further, the contact portion of the first and second portions is not limited to the cylindrical shape as long as the contact portion contacting with the loaf bread has a smooth curved shape. That is, the contact portion of the flight may have the shape without roughness or protrusion so as not to damage the loaf bread when the contact portion moves away from the loaf bread.

While the sprockets and chain are used to transmit the rotation force in the present embodiment, the rotation force may be transmitted by pulleys and belt.

While the loaf bread packaging system of the present embodiment is configured by combining the loaf bread packaging apparatus 103, the in-feed conveyer 105, and the loaf bread conveying apparatus 1, the present invention is not limited to this configuration. The bread conveying apparatus of the present invention can be used in various processes for producing the bread such as making, packaging, conveying the bread. Also, the present invention can be used when it is necessary to change the conveying speed at a predetermined region in the conveying path.

In addition, as a modification of the present embodiment, the coaxial arrangement may be employed in which the upstream end sprocket 13 (or the downstream sprocket 15) disposed upstream (downstream) the first discharge conveyer 3 and the second driven sprocket 41 (or the second driving sprocket 39) of the second discharge conveyer 9 are provided to a single shaft, and respective sprockets are adapted to rotate independently of each other.

It is noted that the loaf bread packaging apparatus of the present embodiment is configured to package the loaf bread with the polyethylene bag, the present invention is not limited to this configuration. The packaging material is not limited to the member made of plastic such as polypropylene, polyester, nylon, however, the material made of paper, metal, close, and the like may also be used. Further, the number of the first and second flights 5, 11 can be changed to any number.

While the present embodiment has been described by using the loaf bread of the rectangular solid shape, the present invention is not limited for the loaf bread, and thus can be applied to the bread conveying apparatus for conveying the breads of various sizes and shapes, and the bread slicing apparatus for slicing the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-211467, filed Sep. 21, 2010, which is hereby incorporated by reference herein in its entirety.

What is claimed is:

1. A bread conveying apparatus, comprising:
a first discharge conveyer for conveying a bread, the first discharge conveyer being disposed along a conveying path on which the bread is conveyed, the first discharge conveyer comprising a first flight for urging the bread;
a second discharge conveyer, disposed along the conveying path, for conveying the bread in a common region that extends within a region on the conveying path where the first discharge conveyer runs, the second discharge conveyer comprising a second flight for urging the bread; and
a control unit for controlling the first discharge conveyer and the second discharge conveyer such that the bread is urged not by the first flight but by the second flight in the common region,
wherein the control unit performs a control such that a conveying speed at which the bread is conveyed by the second discharge conveyer is different from a conveying speed at which the bread is conveyed by the first discharge conveyer.

2. A bread conveying apparatus according to claim 1, wherein the bread is urged by the first flight in a region except the common region on the conveying path.

3. A bread conveying apparatus according to claim 1, wherein a contact portion of the first flight that comes into contact with the bread and/or a contact portion of the second flight that comes into contact with the bread is curved.

4. A bread conveying apparatus according to claim 2, wherein a contact portion of the first flight that comes into contact with the bread and/or a contact portion of the second flight that comes into contact with the bread is curved.

5. A bread conveying apparatus according to claim 1, wherein a contact portion of the first flight and/or the second flight is rotatable.

6. A bread conveying apparatus according to claim 2, wherein a contact portion of the first flight and/or the second flight is rotatable.

7. A bread conveying apparatus according to claim 3, wherein the contact portion of the first flight and/or the second flight is rotatable.

8. A bread conveying apparatus according to claim 4, wherein the contact portion of the first flight and/or the second flight is rotatable.

9. A bread conveying apparatus according to claim 1, wherein the first discharge conveyer and the second discharge conveyer are revolved at respective uniform velocities.

10. A bread conveying apparatus according to claim 2, wherein the first discharge conveyer and the second discharge conveyer are revolved at respective uniform velocities.

11. A bread conveying apparatus according to claim 3, wherein the first discharge conveyer and the second discharge conveyer are revolved at respective uniform velocities.

12. A bread conveying apparatus according to claim 4, wherein the first discharge conveyer and the second discharge conveyer are revolved at respective uniform velocities.

13. A bread conveying apparatus according to claim 5, wherein the first discharge conveyer and the second discharge conveyer are revolved at respective uniform velocities.

14. A bread conveying apparatus according to claim 6, wherein the first discharge conveyer and the second discharge conveyer are revolved at respective uniform velocities.

15. A bread conveying apparatus according to claim 7, wherein the first discharge conveyer and the second discharge conveyer are revolved at respective uniform velocities.

16. A bread conveying apparatus according to claim 8, wherein the first discharge conveyer and the second discharge conveyer are revolved at respective uniform velocities.

17. A bread conveying apparatus according to claim 1, wherein a rotational center of an upstream sprocket of the second discharge conveyer is disposed downstream of a rotational center of an upstream sprocket of the first discharge conveyer with respect to the conveying path, and a rotational center of a downstream sprocket of the second discharge conveyer is disposed upstream of a rotational center of a downstream sprocket of the first discharge conveyer with respect to the conveying path.

18. A bread conveying apparatus according to claim 1, wherein a rotational center of an upstream sprocket of the second discharge conveyer is disposed downstream of a rotational center of an upstream sprocket of the first discharge conveyer with respect to the conveying path.

19. A bread conveying apparatus according to claim 1, wherein end sides of the common region of the second discharge conveyer are located within the region on the conveying path where the first discharge conveyer runs.

20. A bread conveying apparatus according to claim 1, wherein an entirety of the common region of the second discharge conveyer is located within the region on the conveying path where the first discharge conveyer runs.

* * * * *